(No Model.)
T. A. EDISON.
PHONOGRAPH RECORDER.
No. 393,968. Patented Dec. 4, 1888.
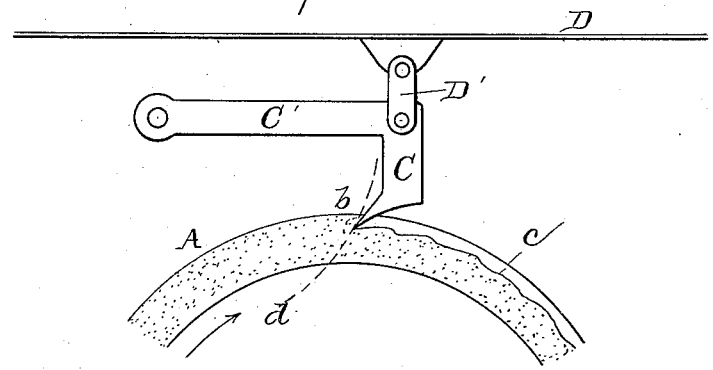
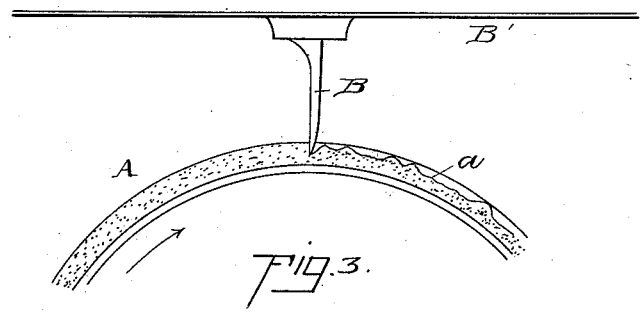
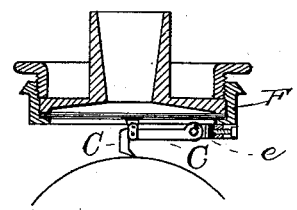
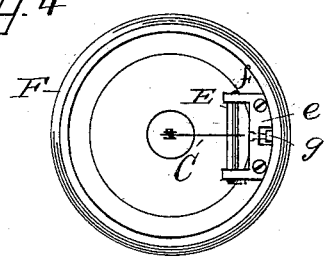
WITNESSES:
INVENTOR,
Thomas A. Edison,
BY
ATTORNEYS.

UNITED STATES PATENT OFFICE.

THOMAS A. EDISON, OF LLEWELLYN PARK, NEW JERSEY.

PHONOGRAPH-RECORDER.

SPECIFICATION forming part of Letters Patent No. 393,968, dated December 4, 1888.

Original application filed July 17, 1888, Serial No. 280,209. Divided and this application filed November 5, 1888. Serial No. 290,023. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Phonographs, (Case No. 813,) of which the following is a specification.

In my application filed July 17, 1888, Serial No. 280,209, of which this application is a division, is set forth a method of recording sound-vibrations by cutting the record in the recording-surface as distinguished from impressing such record by a scraping action, and also an apparatus for carrying such invention into effect. In that application the method only is claimed, the Commissioner of Patents having required me to embody the apparatus in a separate application.

For the recording-surface of my phonograph (*i. e.*, the phonogram-blank) I employ a solid material—such as a wax composition or a mixture of metallic soaps capable of being indented by the recording-point. In recording sounds a groove is formed in the material by means of an indenting-point connected with the diaphragm of the recorder, and this groove varies in depth accordingly as the indenting-point is advanced or withdrawn by the vibrations of the diaphragm, thus forming the wave-record from which the sounds are reproduced, as is well understood.

Heretofore the recording-point used has been constructed so that in forming the groove it removed the material by a scraping action. This was due to the fact that the advancing edge of the recording-style used was perpendicular to the recording-surface or receded from the perpendicular, the result being a scraping rather than a true cutting of the material. The scraping action I have found to be productive of false vibrations, which become a part of the record, and which are audible as scratching and other foreign noises when the sounds are reproduced. I have found that this difficulty is overcome by employing a recording-point made as a true cutting-tool with a cutting-edge in advance of the stock of the tool. It might be supposed that a cutting-tool would be unsuitable for the recording-point and that the heel of the tool would strike the bottom of the groove and prevent the formation of a perfect record, or obliterate the record as made by smoothing or pressing out the indentations more or less; but I have found that the movement of the recording-surface is sufficient to keep the heel of the tool clear of the indentations. This adaptability of the cutting-tool form for the recording-point I consider is also due in a measure to the fact that the recording-point in my phonograph is arranged to act more or less obliquely to the recording-surface, so that the recorded waves will begin gradually and end abruptly. This oblique movement may be accomplished in any of the ways described in my application No. 786, (Serial No. 280,204,) in which this particular matter is more fully explained. The recording-point in its forward movement advancing against the movement of the recording-surface, the cutting-tool will clear itself just to the extent that its movement advances from the perpendicular, and thus the speed of the recording-surface will be supplemented in the respect of serving to keep the heel of the tool clear by the oblique movement of the cutting-tool. The waves, being abrupt, need not be as deep, and hence there is less difficulty in clearing the tool.

In my phonograph the cutting-tool recording-point is carried by a lever, which takes the lateral thrust of the tool and relieves the diaphragm of the strain due to that thrust. This carrying-lever is also pivoted so as to produce the oblique movement of the recording-point, before referred to. It also is made light, is provided with friction-bearings to overcome the momentum of the diaphragm and attached parts and to take up lost motion, and it is also positively connected with the diaphragm by a pivoted link or other form of connection which will yield in the direction of the length of the lever, so as to prevent the straining of the diaphragm.

While I prefer to employ these several details, yet it is evident that the cutting-tool can be used with phonograph-recorders of various constructions, and hence I do not wish that feature of my invention, except when specially indicated by the claims, to be limited to the details stated. The cutting of the record in the material of the recording-surface instead of scraping it makes a clean smooth record free from imperfections producing scratching or other foreign noises in the reproducer.

In the accompanying drawings, forming a part hereof, Figure 1 is a view, on an exaggerated scale, illustrating the formation of a record by a scraping-style as heretofore. Fig. 2 is a similar view illustrating the use of this invention. Fig. 3 is a vertical section of my phonograph-recorder complete, and Fig. 4 is a bottom view of the recorder.

A is the recording-surface, which may be considered as a wax composition capable of being indented by the recording-point or style. It is a given a movement in the direction of the arrows, Figs. 1 and 2.

Heretofore the recording-style B has had its advancing edge perpendicular to the recording-surface or receding from it, as shown in Fig. 1. This produced the record $a$ by a scraping action. By my invention the recording-point C, Fig. 2, is a cutting-tool having a cutting-edge, $b$, in advance of the stock of the tool. This produces the record $c$ by a true cutting action. The style B is attached directly and only to the diaphragm B', and hence the wave-record $a$ is composed of waves having a symmetrical rise and fall with the deepest part of each wave at its center. The point C is mounted on a pivoted lever, C', connected with the diaphragm D by a pivoted link, D'. The direction of movement of the cutting-edge of the recording-point C is described by the dotted circle $d$; hence it will be seen that the recording-point C acts obliquely to the recording-surface and produces recorded waves which begin gradually and end abruptly. It will be seen that such is the character of the wave-record $c$. By the movement of the recording-surface and the oblique action of the recording-point the heel of the cutting-tool, forming the recording-point, is kept clear in operation.

From the description that has already been given and an inspection of Figs. 3 and 4 it will be readily understood how my phonograph-recorder is constructed. The lever C' is carried by a bearing-pin, E, which is pivoted in a yoke, $e$, secured to the annular frame F of the recorder. A spring, $f$, bears against the pin E, and is adjusted in its tension by a screw, $g$. This produces a friction at the bearings of the pin E, which overcomes the momentum of the diaphragm and attached parts by retarding their movement, and also takes up all lost motion at the bearings. The spring-friction produces a non-resilient and constantly-acting retarding device. The pivoted link D' prevents the diaphragm from being strained by the differences in movement of the diaphragm and the recording-point by reason of the fact that the link, due to its pivots, yields in the direction of the length of the carrier-lever, while it forms a positive connection between the recording-point and the diaphragm.

What I claim is—

1. A phonograph-recorder having for its recording-point a cutting-tool with a cutting-edge in advance of the stock of the tool, substantially as set forth.

2. In a phonograph-recorder, the combination, with the diaphragm, of a cutting-tool recording-point connected with the diaphragm and mounted to move obliquely to the recording-surface, substantially as set forth.

3. In a phonograph-recorder, the combination, with the diaphragm, of a cutting-tool recording-point connected with the diaphragm, and a non-resilient constantly-acting retarding device for retarding the movement of such point in both directions, substantially as set forth.

4. In a phonograph-recorder, the combination, with the diaphragm, of a cutting-tool recording-point connected with the diaphragm, a lever carrying such point, and a positive connection between the point and the diaphragm, which connection is constructed to yield in the direction of the length of the lever, substantially as set forth.

This specification signed and witnessed this 31st day of October, 1888.

THOMAS A. EDISON.

Witnesses:
WILLIAM PELZER,
E. C. ROWLAND.